US012633707B2

(12) United States Patent
Leahy

(10) Patent No.: US 12,633,707 B2
(45) Date of Patent: May 19, 2026

(54) UNIVERSAL TECHNOLOGY SOCKET

(71) Applicant: Charles H. Leahy, Asheville, NC (US)

(72) Inventor: Charles H. Leahy, Asheville, NC (US)

(73) Assignee: Eco-Panels, LLC, Mocksville, NC (US)

( * ) Notice: Subject to any disclaimer, the term of this patent is extended or adjusted under 35 U.S.C. 154(b) by 934 days.

(21) Appl. No.: 17/392,916

(22) Filed: Aug. 3, 2021

(65) Prior Publication Data

US 2022/0045464 A1 Feb. 10, 2022

Related U.S. Application Data

(60) Provisional application No. 63/061,499, filed on Aug. 5, 2020.

(51) Int. Cl.
H01R 13/66 (2006.01)
H02J 7/00 (2006.01)

(52) U.S. Cl.
CPC ........ H01R 13/6683 (2013.01); H02J 7/0045 (2013.01)

(58) Field of Classification Search
CPC ... H01R 13/6683; H01R 24/66; H02J 7/0045; H02J 7/0063; H02J 50/12
See application file for complete search history.

(56) References Cited

U.S. PATENT DOCUMENTS

| | | | |
|---|---|---|---|
| 4,720,675 A * | 1/1988 | Bishop | G01R 1/04 |
| | | | 292/201 |
| 6,361,356 B1 * | 3/2002 | Heberlein | H01R 13/62977 |
| | | | 439/157 |
| 7,045,706 B1 | 5/2006 | Lincoln, III et al. | |
| 7,279,635 B2 | 10/2007 | Hyde | |
| 8,221,158 B2 | 7/2012 | Liao | |
| 8,976,541 B2 | 3/2015 | Ballard | |
| 9,437,978 B2 | 9/2016 | Green | |
| 9,960,580 B1 | 5/2018 | Ruggiero | |
| 10,056,722 B1 | 8/2018 | Ingram | |
| 10,074,948 B2 | 9/2018 | Goyal et al. | |
| 10,199,940 B1 | 2/2019 | Bui | |
| 10,243,399 B2 * | 3/2019 | Jung | H02J 7/0044 |
| 10,263,374 B2 | 4/2019 | Calabrese | |
| 10,270,237 B2 | 4/2019 | Moss | |
| 10,787,803 B2 | 9/2020 | Leahy | |
| 10,958,019 B2 * | 3/2021 | Yilmaz | H01R 13/6691 |
| 11,101,609 B2 * | 8/2021 | Parks | H02J 13/00026 |
| 2005/0180561 A1 * | 8/2005 | Hazani | H04B 3/542 |
| | | | 379/438 |

(Continued)

FOREIGN PATENT DOCUMENTS

KR 2020090006484 U 7/2009

*Primary Examiner* — Daniel Cavallari
*Assistant Examiner* — Brian K Baxter
(74) *Attorney, Agent, or Firm* — Neo IP

(57) ABSTRACT

The present invention is directed to a smart universal technology socket. The technology socket provides for easy installation and connection to an electrical power source. The technology socket is operable to receive hot swappable, modifiable, and upgradable pluggable devices. The technology socket supports pluggable devices with a variety of electrical requirements. The present invention provides a self-retaining technology socket for home, medical, school, and industrial uses.

8 Claims, 12 Drawing Sheets

100

130

120

(56) References Cited

U.S. PATENT DOCUMENTS

| | | | |
|---|---|---|---|
| 2009/0212905 A1* | 8/2009 | Batz | B60G 17/017 |
| | | | 340/5.2 |
| 2010/0066167 A1* | 3/2010 | Schmidt | H01F 38/14 |
| | | | 318/16 |
| 2014/0049211 A1* | 2/2014 | Park | H02J 7/0042 |
| | | | 320/108 |
| 2014/0093057 A1* | 4/2014 | Hazani | H01R 31/065 |
| | | | 379/93.06 |
| 2014/0319296 A1* | 10/2014 | Clouser | H02J 7/0044 |
| | | | 248/346.03 |
| 2017/0093148 A1* | 3/2017 | Wang | F21V 23/023 |
| 2018/0254584 A1* | 9/2018 | Zondag | H01R 13/703 |
| 2019/0065791 A1* | 2/2019 | Yoon | G06F 21/86 |
| 2019/0067883 A1 | 2/2019 | Yilmaz et al. | |
| 2019/0089104 A1* | 3/2019 | O'Reilly | F21S 9/022 |
| 2019/0181590 A1* | 6/2019 | Bae | G01R 31/2813 |
| 2019/0189981 A1* | 6/2019 | Neumann | H01M 50/296 |
| 2019/0237917 A1* | 8/2019 | O'Reilly | H01R 13/7175 |
| 2020/0006886 A1 | 1/2020 | Chen | |
| 2020/0021065 A1 | 1/2020 | Chu et al. | |
| 2020/0259301 A1* | 8/2020 | Schmitz | H01R 13/6691 |
| 2020/0287334 A1* | 9/2020 | Kulkarni | H01R 13/64 |
| 2021/0351716 A1* | 11/2021 | Richards | H02M 3/158 |
| 2022/0149607 A1* | 5/2022 | Booyse | H02G 3/18 |
| 2023/0304324 A1* | 9/2023 | Millikin | E05B 9/04 |

* cited by examiner

100

110

110

100

110

112

118

116

100

130

120

212

214

210

100

214

100

210

100

220

230

UNIVERSAL TECHNOLOGY SOCKET

CROSS REFERENCES TO RELATED APPLICATIONS

This application claims priority to and the benefit of U.S. Provisional Application No. 63/061,499, filed Aug. 5, 2020, which is incorporated by reference in its entirety.

BACKGROUND OF THE INVENTION

1. Field of the Invention

The present invention relates to a technology socket for housing and powering pluggable devices and more specifically to a universal technology socket.

2. Description of the Prior Art

It is generally known in the prior art to provide devices and methods for powering electronic devices.

Prior art patent documents include the following:

US Patent Publication No. 2020/0006886 for expandable and upgradeable universal socket by inventor Chen, filed Sep. 10, 2019 and published Jan. 2, 2020, is directed to an expandable and upgradeable universal socket including a socket body and a function module. The function module is replaceable and upgradeable, and is detachably fixed to the socket body. A power circuit of the function module is separably connected to a power circuit of the socket body to enable the function modules to plug and play. A space is provided in the socket body to accommodate the functional module, and a surface of the socket body is provided with a function area corresponding to the function module. Various expanded function modules can be matched and arranged in the reserved space. Small electronic components can be accommodated in the socket bottom box, and the number of external power transformers are reduced, which saves space, reduces exposed wires and beautifies the appearance. There is no need to replace the entire socket when upgrading the socket, which is environmentally friendly and energy saving.

U.S. Pat. No. 10,270,237 for interruptible universal wall box and methods of use thereof by inventor Moss, filed Nov. 29, 2016 and issued Apr. 23, 2019, is directed to an electrical wall box having plurality of wire power terminals on exterior of electrical wall box, wire power terminals are electrically connected to one of plurality of insulated distribution busses within electrical wall box, each distribution buses having one or more interrupt bus switches electrically connected therein; each distribution buses has first quick connect terminal electrically connected thereto one distribution buses; wherein electrical wall box further includes plurality of switch wiring terminals on an exterior of electrical wall box, each plurality of switch wiring terminals includes insulated electrical tap connecting one switch wiring terminals to one plurality of internal insulated distribution busses or to quick connect terminal within electrical wall box; one or more pluggable electrical receptacles, each one or more pluggable electrical receptacles includes two or more second quick connect terminals to electrically connect thereto one of said one or more first quick connect terminals; a plaster ring, and cover plate.

U.S. Pat. No. 10,263,374 for modular socket box by inventor Calabrese, filed Jun. 18, 2018 and issued Apr. 16, 2019, is directed to a modular electronic apparatus including an electric box, an insert, and optionally one or more electric modules. The insert is configured to be inserted at least partially into an internal space of the electric box and connect to electric wires of a building. The insert is further configured to receive the electric modules such that they can be powered from the electric wires without directly connecting to them. The electric modules can engage with the insert and be easily replaceable without the need to reconnect the electric wires. Each of the electric modules can be one of the following: a programmable electric socket ("smart" socket), traditional electric socket, programmable electric switch ("smart" switch), traditional electric switch, dimmer, touch screen panel, speaker, personal computer, television device, lighting device, audio player, multimedia device, network hub, a router, and the like.

U.S. Pat. No. 8,221,158 for replaceable module for socket and socket having replaceable module by inventor Liao, filed Jul. 6, 2011 and issued Jul. 17, 2012, is directed to a socket having a replaceable module includes a socket panel and a replaceable module. The socket panel is provided with socket units. The replaceable module is detachably provided on the socket panel. The replaceable module is provided with socket subunits. The edge of the replaceable module is provided with a trough located between the replaceable module and the socket panel. The reference further provides a replaceable module for a socket. The replaceable module can be replaced according practical demands, which makes it more versatile. Further, the replaceable module has a better safety.

U.S. Pat. No. 10,074,948 for power receptacles with internal chambers for releasably holding portable power devices by inventor Goyal, et al., filed Aug. 26, 2015 and issued Sep. 11, 2018, is directed to a power receptacle with a housing having an inwardly extending chamber, the inwardly extending chamber having a depth dimension that is between 0.5 inches and 5 inches, more typically between 1 and 5 inches, sized and configured to releasably receive a portable power supply inside the chamber. The housing includes an internal electrical charging interface. When the portable power supply is in the chamber, the portable power supply electrically engages the electrical charging interface to thereby charge the portable power supply. The receptacles can be in-wall or in-floor units. The housings can be a "custom" housing size and/or may be configured to occupy a single gang box or a compartment of a multi-gang junction box.

US Patent Publication No. 2019/0067883 for smart and robust wall socket with integrated universal serial bus (usb) by inventor Yilmaz et al., filed May 21, 2018 and published Feb. 28, 2019, is directed to a smart electrical plug supports one or more electrical outlets and one or more universal serial bus (USB) outlets for charging electrical devices. Electrical power consumed through the one or more electrical outlets may be measured individually or in combination and reported via a wireless communication channel. The smart electrical plug may be implemented by a plurality of printed circuit board assemblies and distributed within a housing to reduce the effects of heat dissipation. The smart electrical plug may further reduce heat dissipation by utilizing one or more electrical circuit approaches.

U.S. Pat. No. 10,056,722 for devices and methods for providing electrical power by inventor Ingram, filed Apr. 26, 2016 and issued Aug. 21, 2018, is directed to devices and methods to provide electrical power. A device of the invention may comprise a particular arrangement of components including a plug assembly including positive and negative prongs, outwardly facing, for interfacing with a female cord end; a first outlet assembly including positive and negative apertures, outwardly facing, for interfacing with a male cord end; and with the plug assembly and first outlet assembly disposed in an interior space of the device at a back of a housing of the device; a second outlet assembly including at least one receptacle for interfacing with a male cord end, the second outlet assembly disposed in the interior space of the device and supported by the at least one vertical wall at a front of a housing of the device, the second outlet having a negative connection and a positive connection; and a circuit breaker.

U.S. Pat. No. 9,960,580 for universal electrical box by inventor Ruggiero, filed Apr. 10, 2013 and issued May 1, 2018, is directed to an assembly that simplifies the wiring of switches, receptacles and other such termination devices within a junction box. The reference utilizes a dielectric body having a front surface and a side surface. The dielectric body is sized to fit within the electrical junction box. Side connector ports are disposed on the side surface of the dialectic body. A termination device is present at the front surface of the dielectric body. Conductive elements extend through the dielectric body and connect the termination device to the side connector ports. As such, electrical power is provided to the termination device through the side connector ports and the conductive elements that pass through the dielectric body.

US Patent Publication No. 2020/0021065 for smart socket by inventor Chu et al., filed May 22, 2017 and published Jan. 16, 2020, is directed to a smart socket including a main body and a smart system. The main body has at least two slots, each of the at least two slots extends linearly along an extension direction, each of the at least two slots is for a pin of a plug to insert thereinto along an insertion direction and slidable along the extension direction, and the extension direction is perpendicular to the insertion direction. The smart system can communicate and interact with an electronic device, and the smart system can switch the electronic device on or off remotely.

U.S. Pat. No. 7,045,706 for flush floor service hideaway universal box assembly by inventor Lincoln, III et al., filed Feb. 23, 2005 and issued May 16, 2006, is directed to a universal floor box assembly including a universal box having a bottom wall, and front, rear right side and left side walls extending upwardly from the bottom wall. The front, rear, right side and left side walls each define a respective upper terminal edge. At least one of the front, rear, right side and left side walls define an aperture formed therein. Desirably, an electrical, a telephonic and/or a data cable is/are receivable within the universal box. The universal box assembly further includes an electrical, telephonic and/or data interface selectively front loaded in the aperture of the backing member. The at least one electrical, telephonic and data interface are selectively connectable to a transition block assembly of the power cable.

U.S. Pat. No. 10,199,940 for direct current power delivery system by inventor Bui, filed Mar. 27, 2018 and issued Feb. 5, 2019, is directed to several example multi-DC voltage (MDC) boxes and associated power delivery systems. The MDC box can take a 24-60 VDC input (or other values) and can provide multiple DC output voltages for electronic devices and medical devices to plug-in directly without having a need for a bulky AC-DC power adapter.

U.S. Pat. No. 8,976,541 for electrical power and data distribution apparatus by inventor Ballard, filed Aug. 30, 2012 and issued Mar. 10, 2015, is directed to an electrical power and data distribution apparatus comprising an enclosure having a rear connector configured to connect to a first cable including electrical power and data conductors, a front connector configured to connect to a second cable including electrical and data conductors, at least one electrical power outlet configured to connect to a power plug and at least one data input/output connector configured to connect to a device having a predetermined connection configuration. A power hub is connected to the rear connector to receive electrical power, and to the front connector and the power outlet to supply electrical power. The data conductors of the front and rear connectors are connected to a network interface of a controller for sending and receiving data with a first protocol, and the data input/output connector is connected to an input/output section of the controller for sending and receiving data with a second protocol.

U.S. Pat. No. 9,437,978 for modular electrical connector by inventor Green, filed Jun. 5, 2015 and issued Sep. 6, 2016, is directed to a system for providing electrical energy and related components. More specifically, a universal module that is adapted to fit within a junction box commonly found in building construction is provided. The wire cable associated with a dwelling, for example, is interconnected to the module, which provides a plurality of locations for receipt of corresponding electrical connectors of an outlet or switch. The modules quickly and safely receive an electrical component, which reduces time and associated costs related to electrical system installation, repair, or modification.

U.S. Pat. No. 7,279,635 for quick connecting universal electrical box and wiring system by inventor Hyde, filed Feb. 3, 2005 and issued Oct. 9, 2007, is directed to a quick connecting universal electrical box system for the mounting of electrical sockets, switches or any electronic or communication component that is typically installed into a wall is disclosed. The system comprises a mounting frame and an electrical box, which can be pre-wired with any socket unit or component, such that installation of the electrical box into a wall is greatly simplified. The mounting frame is first inserted into a wall, followed by insertion of the electrical box into the mounting frame. The action of inserting the electrical box into the mounting frame forces flaps in the mounting frame to engage and lock the mounting frame into the wall. Retaining studs formed on flexible side panels of the electrical box then engage with corresponding openings in the mounting frame to secure the electrical box within the mounting frame. Secure installation of this electrical box is simple and quick without the need for any tools or fastening screws.

SUMMARY OF THE INVENTION

The present invention relates to a universal technology socket.

It is an object of this invention to provide a mounting for pluggable devices which are hot swappable and upgradeable.

It is another object of this invention to provide a technology socket that is configured to power a variety of electronic devices or pluggable devices.

Another object of the present invention is to provide a socket that is operable to provide physical retention, is configured flush with a surface, and includes a locking mechanism.

Another object of the present invention is to create a standard for sockets for devices to eliminate transformers and power cords for countless pluggable devices around the home.

In one embodiment, the present invention includes a universal technology socket including a housing including a positioning component, a processor, and at least one electrical pin, wherein the housing is configured to receive at least one pluggable device, wherein the positioning component is configured to maintain a connection between the housing and the at least one pluggable device, wherein the at least one electrical pin is operable to connect with the at least one pluggable device, and wherein the housing further includes an extendable portion, wherein the extendable portion is configured to extend in a horizontal direction and a vertical direction, wherein the extendable portion is configured to hold the at least one pluggable device in a position flush with the housing.

In another embodiment, the present invention includes a universal technology socket including a processor, a housing, at least one electrical port, and at least one power supply, wherein the housing is configured to receive at least one pluggable device, wherein the at least one electrical port is connected to the at least one power supply, wherein the at least one electrical port is configured to connect to the at least one pluggable device, wherein the at least one electrical port is configured to transfer data relating to the at least one pluggable device to the processor, wherein the at least one pluggable device data includes power data, and wherein the at least one pluggable device is configured to receive power via the at least one power supply via the connection between the at least one pluggable device and the at least one electrical port.

In yet another embodiment, the present invention includes a universal technology socket including a housing, a processor, at least one cutting element, a positioning mechanism, and at least one retaining element, wherein the housing is configured to receive at least one pluggable device, wherein the housing is configured to receive a plurality of removable covers, wherein each removable cover of the plurality covers is configured to attach to the housing via at least one attachment mechanism, and wherein the positioning component is configured to maintain a connection between the housing and the at least one pluggable device.

These and other aspects of the present invention will become apparent to those skilled in the art after a reading of the following description of the preferred embodiment when considered with the drawings, as they support the claimed invention.

DETAILED DESCRIPTION

Figure 1:
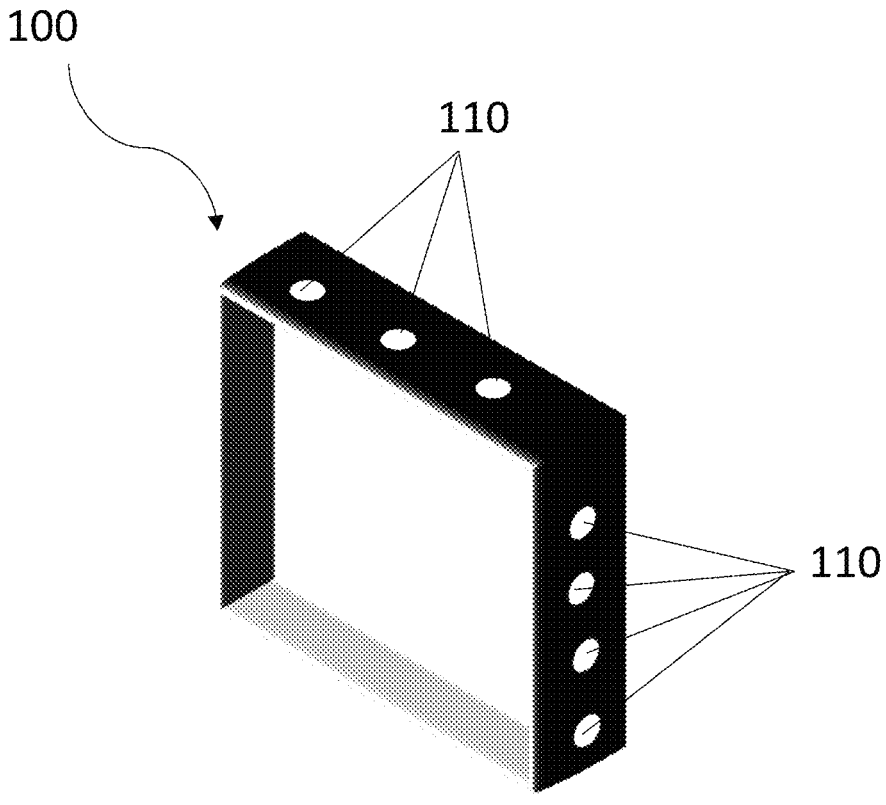
FIG. 1 illustrates a front perspective view of a technology socket according to one embodiment of the present invention.

The present invention is generally directed to universal technology sockets.

In one embodiment, the present invention includes a universal technology socket including a housing including a positioning component, a processor, and at least one electrical pin, wherein the housing is configured to receive at least one pluggable device, wherein the positioning component is configured to maintain a connection between the housing and the at least one pluggable device, wherein the at least one electrical pin is operable to connect with the at least one pluggable device, and wherein the housing further includes an extendable portion, wherein the extendable portion is configured to extend in a horizontal direction and a vertical direction, wherein the extendable portion is configured to hold the at least one pluggable device in a position flush with the housing.

In one embodiment, the universal technology socket is further configured to connect to a power supply, wherein the universal technology socket is further configured to provide power to the at least one pluggable device through an electrical connection between the at least one electrical pin and the at least one pluggable device. In another embodiment, the processor is configured to determine at least one power requirement for the at least one pluggable device when the at least one pluggable device is connected to the at least one electrical pin. In yet another embodiment, the positioning component further includes an attachment component and an arm component, wherein the arm component is attached to the attachment component, wherein the attachment component is further configured to attach to the at least one pluggable device, wherein the arm component is configured to align the at least one pluggable device with the at least one electrical pin. In one embodiment, the universal technology socket further includes at least one indicator, wherein the at least one indicator includes an audio indicator, a visual indicator, and/or an audiovisual indicator, wherein the at least one indicator is configured to generate an alert when the at least one pluggable device is connected to the socket. In another embodiment, the universal technology socket further includes at least one battery, wherein the at least one battery is configured to power the universal technology socket and/or the at least one pluggable device, wherein the processor is configured to monitor a status of the at least one battery, wherein the processor is configured to stop the power transfer from the at least one battery to the universal technology socket and/or the at least one pluggable device when the battery status is below at least one threshold. In one embodiment, the universal technology socket further includes at least one temperature sensor, wherein the at least one temperature sensor is in communication with the processor, wherein the processor is configured to turn off the at least one battery if a temperature of the universal technology socket and/or the at least one pluggable device is above at least one threshold. In yet another embodiment, the universal technology socket further includes at least one sensor, wherein the at least one sensor includes an air quality sensor, wherein the universal technology socket is configured to send an alert to at least one remote device based on air quality sensor data. In one embodiment, the universal technology socket is further configured to receive at least one connector, wherein the at least one connector includes at least one of a rectangular connector, a circular connector, a terminal block, a coaxial connector, a d-shaped connector, a pluggable connector, a universal serial bus (USB) connector, a micro USB connector, a lightning connector, a firewire connector, a USB-A connector, a USB-B connector, a USB-C connector, a digital video interface (DVI) connector, a High-Definition Multimedia Interface (HDMI) connector, a video graphics array (VGA) connector, a router connector, a modem connector, or a serial port connector.

In another embodiment, the present invention includes a universal technology socket including a processor, a housing, at least one electrical port, and at least one power supply, wherein the housing is configured to receive at least one pluggable device, wherein the at least one electrical port is connected to the at least one power supply, wherein the at least one electrical port is configured to connect to the at least one pluggable device, wherein the at least one electrical port is configured to transfer data relating to the at least one pluggable device to the processor, wherein the at least one pluggable device data includes power data, and wherein the at least one pluggable device is configured to receive power via the at least one power supply via the connection between the at least one pluggable device and the at least one electrical port.

In one embodiment, the universal technology socket further includes a step-down converter, wherein the processor is configured to determine at least one power requirement for the at least one pluggable device based on the at least one pluggable device data, wherein the step-down converter is configured to transform an input voltage from the at least one power supply to match the at least one power requirement for the at least one pluggable device, and wherein the universal technology socket is configured to provide the transformed input voltage to the at least one pluggable device. In another embodiment, the universal technology socket further includes a power switch, wherein the power switch is positioned on an external surface of the housing, wherein the processor is configured to stop a flow of power from the at least one power supply to the at least one pluggable device when the power switch is switched to a deactivated position. In yet another embodiment, the universal technology socket further includes a cover, wherein the cover is configured to attach to a front surface of the housing via at least one attachment mechanism, wherein the cover is configured to connect to the at least one electrical port, wherein the cover is configured to receive a plurality of connectors, wherein the plurality of connectors includes a Universal Serial Bus (USB)-A connector, a USB-B connector, a USB-C connector, a Video Graphics Array (VGA) connector, a High-Definition Multimedia Interface (HDMI) connector, a micro-USB connector, and/or a lightning connector. In one embodiment, the housing further includes an extendable portion, wherein the extendable portion is configured to extend in a horizontal direction and a vertical direction, wherein the extendable portion is configured to hold the at least one pluggable device in a flushed position. In another embodiment, the universal technology socket is further configured for network communication with at least one remote device, wherein the universal technology socket is further configured to receive at least one software update from the at least one remote device, wherein the universal technology socket is configured to update a software of the at least one pluggable device based on the at least one software update.

In yet another embodiment, the present invention includes a universal technology socket including a housing, a processor, at least one cutting element, a positioning mechanism, and at least one retaining element, wherein the housing is configured to receive at least one pluggable device, wherein the housing is configured to receive a plurality of removable covers, wherein each removable cover of the plurality covers is configured to attach to the housing via at least one attachment mechanism, and wherein the positioning component is configured to maintain a connection between the housing and the at least one pluggable device.

In one embodiment, wherein the universal technology socket is further configured to attach to a panel, wherein the at least one cutting element is configured to create an opening in the panel such that the panel is operable to receive the universal technology socket in the opening, wherein the at least one retaining element is operable to retain the universal technology socket in the panel by applying a force within the opening in the panel, and wherein the at least one retaining element is configured to position the universal technology socket in a flushed position with a surface of the building panel. In another embodiment, the universal technology socket further includes a locking mechanism, wherein the locking mechanism is configured to hold the at least one pluggable device in the housing. In yet another embodiment, the housing includes an extendable portion, wherein the extendable portion is configured to extend in a horizontal direction and a vertical direction, wherein the extendable portion is configured to hold the at least one pluggable device in a flushed manner. In one embodiment, the at least one pluggable device includes at least one of a smart watch, a cell phone, a computer, a laptop, a radio, a speaker, or a sensor.

None of the prior art discloses a universal technology socket that is operable to support hot swappable pluggable devices.

Electrical sockets are difficult and dangerous to install. Additionally, electrical sockets are dangerous to swap and change unless the electric power is disconnected from the electrical socket. Therefore, there is a need for a hot swappable electrical socket that prevents an individual from getting shocked and/or short-circuiting an electrical connection.

Every year new devices are created with different electrical requirements (ex. AC and DC power, different current requirements, etc.) and charging ports and connectors. This causes an issue as typical electrical outlets are not adaptable to different electrical devices with varying electrical requirements. Furthermore, new software is associated with new technology and is not always adaptable with older sockets. Another problem is that most universal electrical sockets are unsafe and provide electrical and fire hazards. Electrical socket standards vary from country to country, which makes it difficult to meet all requirements. For example, grounding is an issue as some electrical plugs have a third pin for a ground connection whereas other electrical plugs have grounding clips on the side of a plug. Additionally, a power cord adapter and/or a wall transformer is needed to handle electrical devices with differing power requirements. A power cord can be several feet long, thereby increasing the power necessary to properly power a socket and/or electrical device as well as taking up space and creating a potential hazard. Thus, an upgradeable universal socket that can adapt and function with new technology while limiting space and/or decreasing hazard risk is needed.

Other common issues with current sockets include voltage mismatches, exposure of live pins, lack of proper round connection, lack of protection from overloading or short circuiting. Additional problems include durability, plug retention force, and temperature management.

Additionally, when outfitting a building, installing building fixtures and/or upgrading a home, there is a need to provide electrical power. Typically, a professional electrician is needed to provide proper installation of pluggable devices, switches and wall outlets, however this increases building installation cost. Therefore, there is a need for easy installation and replacement of modules such as electrical outlets, switches, cameras, sensors, and other devices in real-time without a professional electrician.

The present invention addresses the issues of prior art. In one embodiment, the present invention includes a technology socket operable to receive a plurality of different hot swappable pluggable devices. In another embodiment, the technology socket of the present invention includes a modifiable receptacle that is operable to change its shape and direction to connect with a hot swappable pluggable device.

As used throughout the current specification, a universal technology socket includes a receptacle, housing, or body configured to receive an electrical device, a pluggable device, a power consuming device, adapters, and other similar devices. In one embodiment, the universal technology socket is operable to provide power to a device inserted into the socket. In another embodiment, the universal technology socket is not operable to provide power to a device inserted into the socket. The universal technology socket is also referred to as a socket or technology socket throughout the present application.

Referring now to the drawings in general, the illustrations are for the purpose of describing one or more preferred embodiments of the invention and are not intended to limit the invention thereto.

Figure 2:
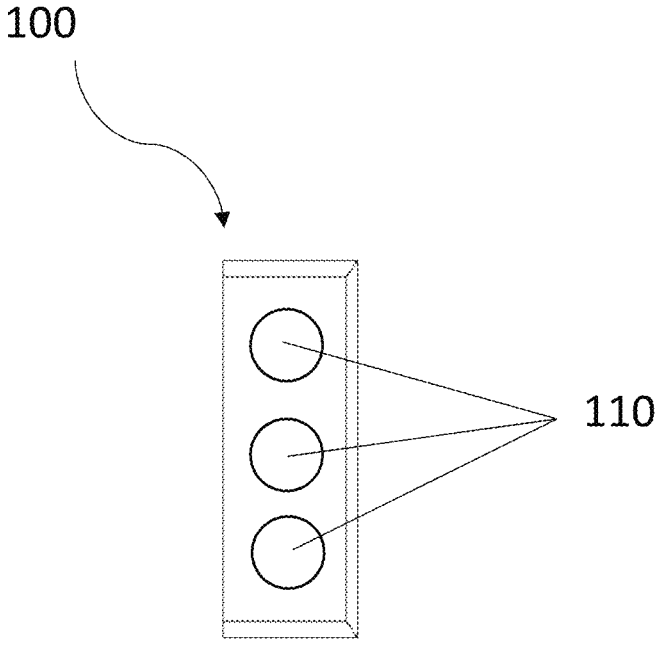
FIG. 2 illustrates a side transparent view of a technology socket according to one embodiment of the present invention.

FIG. 1 illustrates a technology socket according to one embodiment of the present invention. The technology socket 100 includes at least one hole 110 that enables at least one wire and/or connector to attach to the technology socket 100. Preferably, the at least one hole 110 is operable to be created by an installer of the technology socket 100, with the technology socket 100 providing for a variety of different holes to be formed in the technology socket 100 by removing tabs or other components to form the holes. The technology socket 100 is operable to receive at least one pluggable device. In one embodiment, the at least one wire includes a power wire that is operable to provide electricity for at least one pluggable device. FIG. 2 shows a side transparent view of a technology socket according to one embodiment of the present invention.

Figure 3:
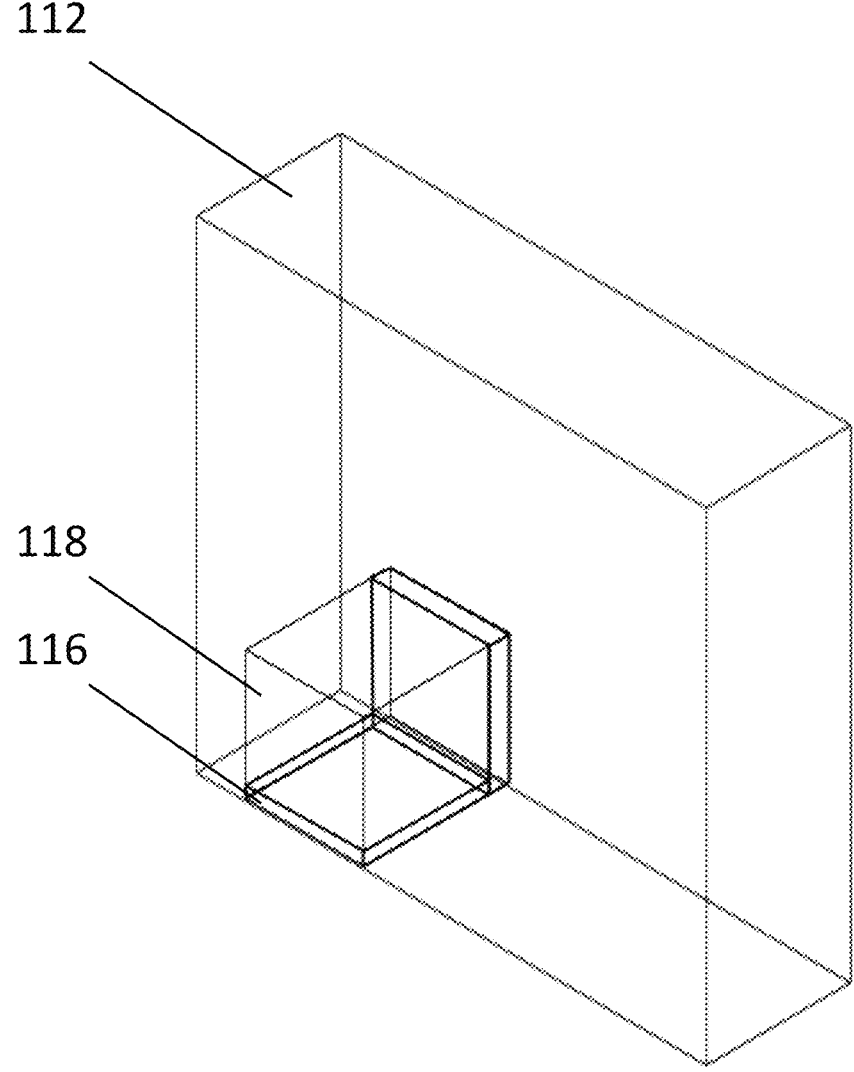
FIG. 3 illustrates a front perspective view of a technology socket in a wall panel according to one embodiment of the present invention.

FIG. 3 illustrates a technology socket in a wall building panel according to one embodiment of the present invention. The technology socket 100 is configured to securely attach to the wall panel 112. In one embodiment, the technology socket 100 is configured to adhere to insulation (ex. foam).

In another embodiment, the technology socket 100 is configured to attach to a stud. The wall panel 112 is configured so heat is dissipated through the pluggable device 100. In one embodiment, the technology socket 100 includes a metal material. Alternatively, the technology socket 100 includes a plastic material. In another embodiment, the technology socket is operable to function as a storage device. For example, and not limitation, the technology socket is operable to function as a safe. The technology socket is operable to receive a command from at least one remote device to function as a safe. Upon receiving the command from the at least one remote device to function as a safe, the technology socket becomes locked via engagement of a physical lever 116 and is inaccessible until a second command is received from the at least one remote device to unlock the technology socket. Alternatively, the socket is operable to be manually locked. Manual locking is operable to be accomplished through activation of a physical lever 116, a key, a combination lock, or any other locking means known in the art. Other locking mechanisms utilize radio frequency communications such as RFID, short range wireless technology such as BLUETOOTH, Near Field Communications (NFC), etc. in combination with a physical locking mechanism to lock and unlock the technology socket. For example, and not limitation, the technology socket includes a removable cover that includes a rotatable latch. The socket is configured to receive the cover via at least one attachment mechanism (e.g. a screw, bolt, bayonet connection) after receiving at least one pluggable device. The technology socket is configured to receive a security command and activate the rotatable latch. The technology socket includes a slot to receive the rotatable latch. When the rotatable latch is inserted into the slot, the technology socket is in a locked position and cannot be open until the rotatable latch is activated with a second security command. In yet another embodiment, the technology socket includes a locking mechanism. The technology socket is configured to receive a command to lock or unlock the socket. The technology socket is then configured to send an electric stimulus to the locking mechanism, thereby activating the locking mechanism. The locking mechanism is configured to rotate inward or outward from the socket to lock or unlock the socket, respectively, depending on the command received. In one embodiment, the locking mechanism is configured to extend into a wall of the technology to enter a locked position.

The technology socket is operable to generate an alert when the technology socket is safe for storage. For example, and not limitation, the technology socket is operable to store items that typically cause a short circuit (ex. keys). The technology socket is further operable to continue functioning as a safe until it receives a second command from the at least one remote device.

In another embodiment, the technology socket of the present invention includes a cutting instrument. In one embodiment, the cutting instrument includes a cutting edge configured to cut into a wall. Advantageously, the technology socket includes an edge element configured to hold the technology socket in place in the wall. For example, and not limitation, the edge element includes a tab, hook, clip, grasp, and other methods of attachment. In one embodiment, the technology socket includes self-tapping screws.

Figure 4:
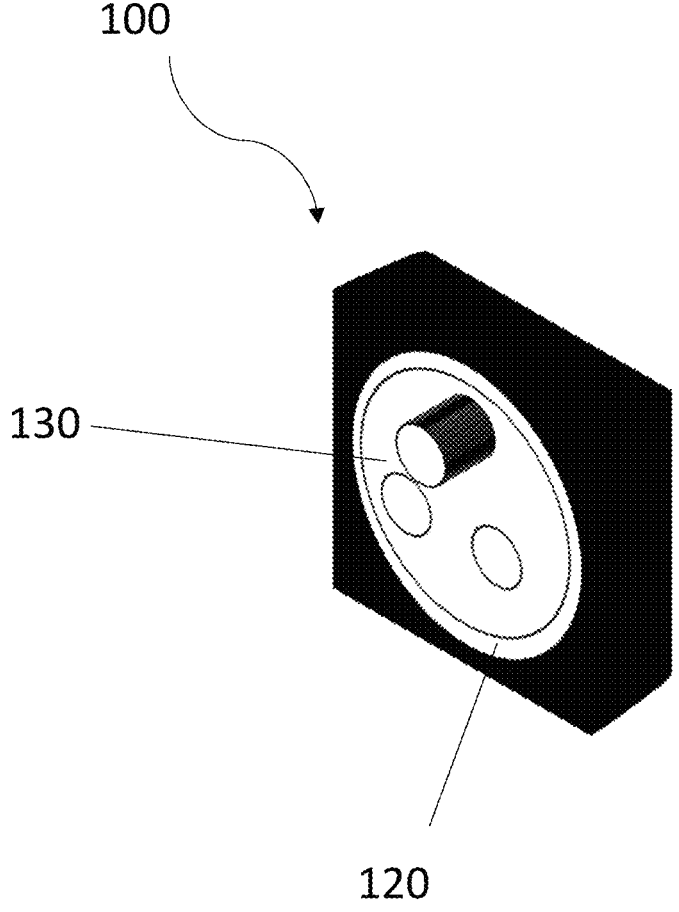
FIG. 4 illustrates a front perspective transparent view of a technology socket with a receptacle according to one embodiment of the present invention of the present invention.

FIG. 4 illustrates a technology socket according to one embodiment of the present invention. The technology socket 100 includes a changeable cover 120 and a receptacle 130 for charging a pluggable device. The changeable cover 120 is operable to receive different electrical receptacles. In one embodiment, the changeable cover 120 is operable to reposition pins, connectors and other methods of attachment for a new electrical receptacle. In another embodiment, the present invention is operable for magnetic attachment of pluggable device. In yet another embodiment, the technology socket is operable to receive a command to reposition the electrical connections, pins and other attachment points. The technology socket includes an automated mechanism that moves the electrical connections, pins and/or other attachment points to a new position.

In one embodiment, the technology socket includes at least one rotating mechanism. The at least one rotating mechanism is configured to receive a cover, a receptacle, or at least one pluggable device. The rotating mechanism is configured to support rotation of plugs, adaptors, pluggable devices, and other devices attached to the technology socket. Advantageously, this enables the technology socket to be used with a variety of plugs, adaptors, and pluggable devices and adapt to environments with different amounts of space. Advantageously, the rotating mechanism prevents an overlap of at least one pluggable devices by enabling the rotation of the at least one pluggable device and/or a pluggable device connector or a plug of the at least one pluggable device. In another embodiment, the technology socket is configured to receive a cover and/or at least one pluggable device via a bayonet connector or a bayonet mount. The technology socket includes a slot configured to receive a pin on a connector from the at least one pluggable device. The slot includes a vertical portion and horizontal portion. The slot is configured so that once the pin reaches the bottom of the vertical portion, then the connector is rotated so the pin moves along the horizontal portion of the slot and lock the pin into place. Advantageously, the pin is not subject to cross threading that is typically a problem with screws.

In yet another embodiment, the technology socket include a plurality of electrical pins and a plurality of electrical circuits. The technology socket is operable to receive at least one pluggable device or receptacle for each electrical circuit of the plurality of electrical circuits. Alternatively, in one embodiment, the technology socket includes a plurality of holes to receive an attachment component (e.g. a screw) from a cover, receptacle, and/or pluggable device.

In another embodiment, the technology socket includes a plurality of compartments. Each compartment of the plurality of compartments has its own controller, processor, and electrical circuit and is operable to receive at least one pluggable device. Advantageously, the technology socket is configured to control power transfer between each compartment based on a battery level of the at least one pluggable device. For example, and not limitation, the technology socket includes a socket controller and socket processor that communicates with a controller and processor for each individual compartment. The socket controller is configured to receive power data from each compartment controller and determine the power requirements of each pluggable device attached to each compartment. Advantageously, the technology socket is further configured to receive a priority command from at least one remote device. The priority command identifies which compartment should have a higher priority to receive power and/or data transfer. The processor is configured to control the transfer of power and/or data to each compartment based on the priority command.

In another embodiment, the technology socket further includes a positioning mechanism. In one embodiment, the positioning mechanism is configured to lock the at least one pluggable device into the technology socket. Alternatively, or additionally, the positioning mechanism is configured to align the at least one pluggable device with at least one electrical pin or another electrical connection point. For example, and not limitation, the positioning mechanism includes an attachment mechanism (e.g. clamps) to connect to the at least one pluggable device. In another embodiment, the positioning mechanism further includes a retractable arm component that is operable to extend and retract and is attached to the attachment mechanism. Once the attachment component is connected to the at least one pluggable device, the arm mechanism is configured to move the at least one pluggable device towards the electrical pin until physical and/or electrical connection is made.

Figure 5:
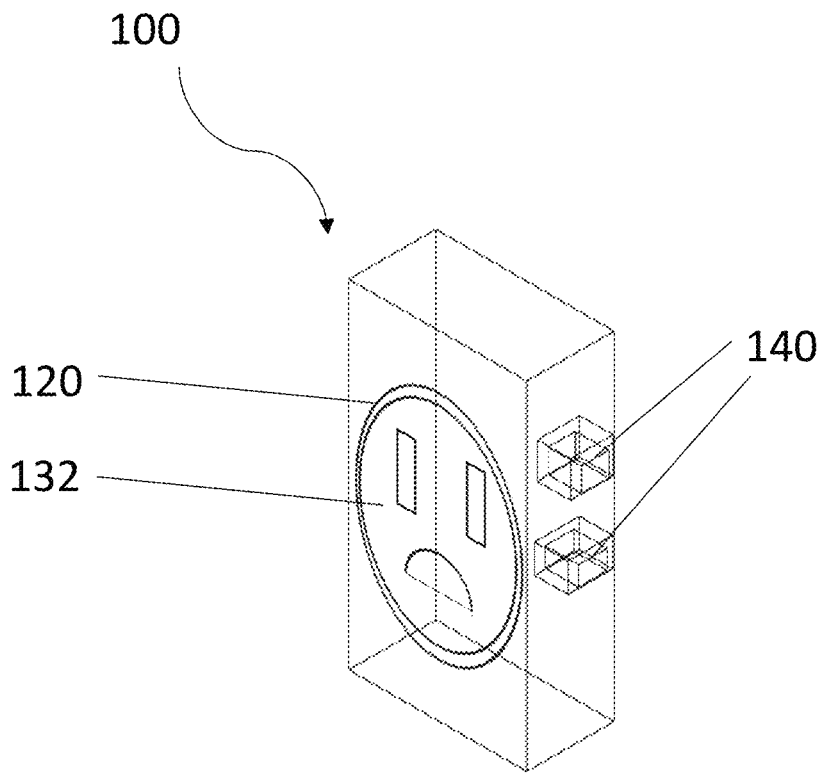
FIG. 5 illustrates a front perspective view of a technology socket with a receptacle according to one embodiment of the present invention of the present invention.

FIG. 5 illustrates a technology socket according to another embodiment of the present invention. The technology socket 100 includes a changeable cover 120 and a receptacle 132 for charging a pluggable device. The technology socket 100 further includes at least one USB connector attachment point 140. In one embodiment, the USB connector attachment point 140 is on a side of the technological socket. Alternately, the USB connector attachment point 140 is operable to be located on any or all sides of the technology socket. Advantageously, in one embodiment, the technology socket includes a variety of electrical connector attachment points operable to receive a USB-A connector, a USB-B connector, a USB-C connector, Video Graphics Array (VGA) connectors, a High-Definition Multimedia Interface connector (HDMI), a micro-USB connector, a lightning connector and other electrical connectors.

In one embodiment, the technology socket is operable to receive at least one wire. The technology socket includes a housing that is configured to hold and provide protection for a pluggable device. In another embodiment, the housing is hot swappable so the pluggable device can be removed and a pluggable device can be inserted without turning off the power.

Figure 6:
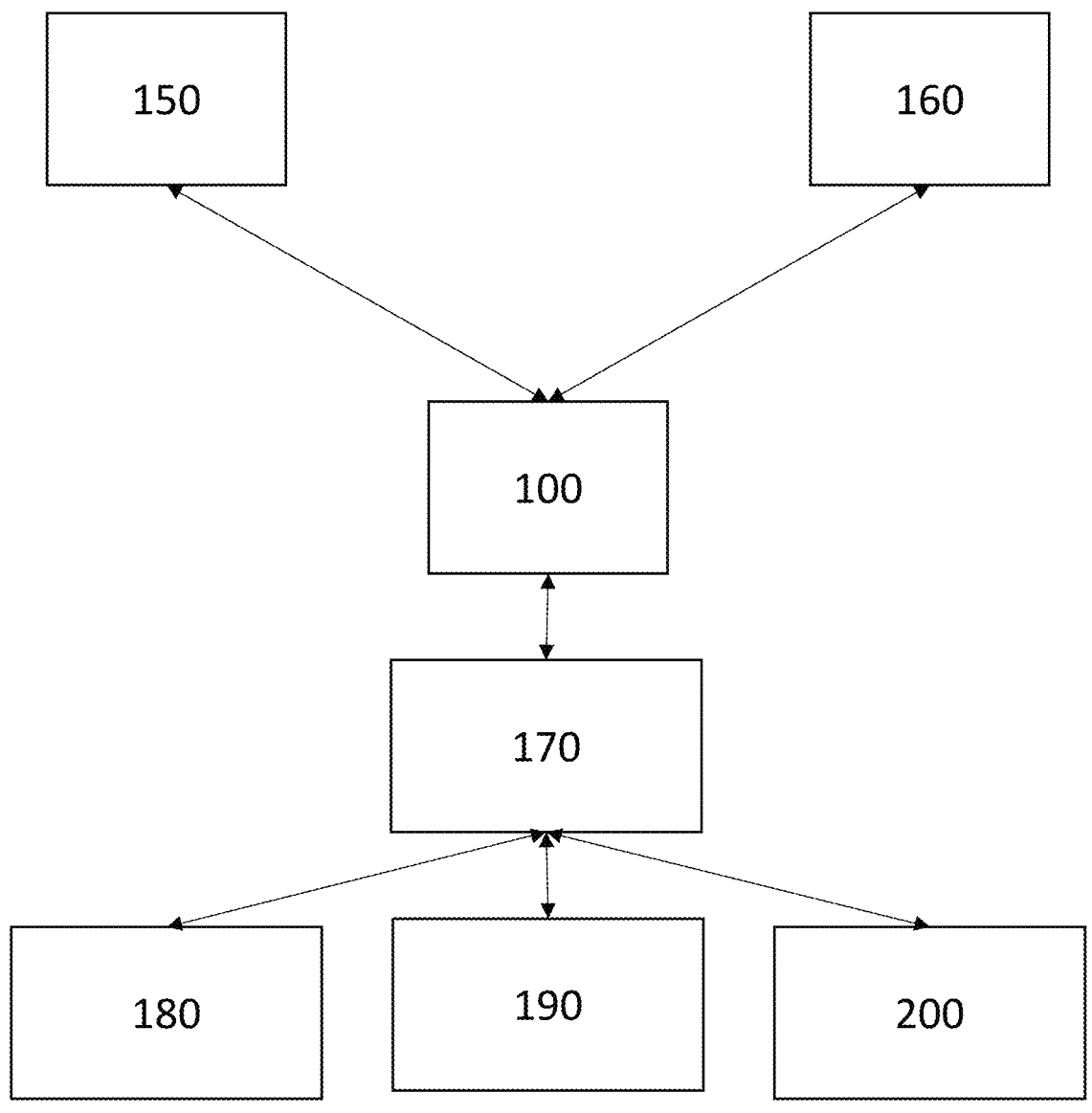
FIG. 6 illustrates a schematic diagram of an electrical system according to one embodiment of the present invention.

FIG. 6 illustrates a schematic diagram according to one embodiment of the present invention. The electrical system includes a technology socket 100 in network communication with a server 150 and at least one remote device 160. The server 150 is operable to store data captured by the technology socket 100 and to provide software updates. The at least one remote device 160 includes a mobile application that allows a user to input electrical requirements for the technology socket 100 and a pluggable device 190. The technology socket 100 further includes a controller 170 configured to adapt the electrical settings of the technology socket 100 in response to the information received from the at least one remote device 160. For example, and not limitation, the electrical settings includes types of power (ex. AC or DC) and voltage and/or current requirements. The controller 170 is operable to collect and provide alerts regarding a circuit 180, the pluggable device 190 and a transmitter 200 inside the technology socket 100. The controller 170 is further configured to generate an alert if there is a malfunction (ex. wire shortage, chance of electrical fire) within the circuit 180, pluggable device 190 and/or transmitter 200. In another embodiment, the mobile application is operable to change a setting for the technology socket. The at least one setting includes power characteristics, function and software. The technology socket functions includes security, charging, discharging and other applications relating to powering and protecting pluggable devices. For example, and not limitation, a user can change the universal socket to the "secure" setting. This means the technology socket is not openable until the setting is changed on the mobile application. The "secure" setting causes a switch to trip in the circuit including the technology socket and prevents the flow of power to the technology socket. This allows a user to use the technology socket as a safe and/or to prevent infants and toddlers from harming themselves with the technology socket.

In another embodiment, the present invention includes an electrical outlet. The electrical outlet includes a neutral circuit, a ground circuit and a hot circuit. In another embodiment, the electrical outlet includes a circuit breaker. In yet another embodiment, the electrical outlet includes at least one hole to receive an electrical plug for an electric device. The electrical outlet includes 1, 2, 3 and/or 4 pins. Alternatively, in one embodiment, the electrical outlet is a ground fault circuit interrupter (GFCI) outlet. The GFCI outlet is configured to constantly monitor a circuit for changes and turn off an electrical circuit if changes (ex. ground fault leakage) occur. In one embodiment, the present invention includes a universal technology socket. The universal technology socket includes an outer box, a live circuit, a neutral circuit, and a ground circuit. In an additional embodiment, the technology socket includes an analytic component. The analytic component is configured to monitor and control power consumption. The analytic component is further operable to analyze power consumption and send alerts to the remote device based on power consumption. In yet another embodiment, the analytic component is configured to receive an upgrade. The upgrade includes software updates for pluggable devices. The pluggable devices include smart watches, cell phones, computers, laptops, radios, speakers and other electrical devices.

In another embodiment, the technology socket includes a processor. The processor manages the overall operations of the technology socket. The processor is any controller, microcontroller or microprocessor that is capable of processing program instructions, software, and/or power data. The processor includes internal programmable functions for programming an expected range of input voltage from a power supply. Additionally, in one embodiment, the processor is operable to communicate with at least one remote device. In another embodiment, the processor is programmed to be in sleep mode when no voltage is detected from a power supply and to activate when an input voltage is detected. Advantageously, the processor consumes significantly less energy when in sleep mode compared to when the processor is activated. In another alternative, the processor is turned on upon application of input voltage from a power supply. Alternatively, the processor is configured to periodically measure power consumption of the technology socket and at least one pluggable device.

In yet another embodiment, the technology socket includes a controller. The controller includes any standard controller or microprocessor device that is capable of executing program instructions. In one embodiment, the controller includes a power conditioning module including power conditioning circuitry that receives input voltage from a power supply and is configured to transform the input voltage to a desired output voltage for at least one pluggable device. In one embodiment, the power conditioning module includes a DC-DC converter.

In one embodiment, the processor is configured to receive power data when at least one pluggable device is connected to the technology socket via an electrical connection (e.g. via at least one electrical pin.) The processor is operable to be in communication with the at least one pluggable device. The processor is configured to determine at least one power requirement of the at least one pluggable device. The processor is in connection with at least one power supply and is operable to transfer power to the at least one plug-gable device based on the at least one power requirement. Advantageously, the processor is configured to continuously monitor the power transfer in real-time and is operable to cut off power transfer based on a power status of the at least one pluggable device.

In another embodiment, the technology further includes at least one sensor in communication with the processor. For example, and not limitation, the at least one sensor includes a temperature sensor configured to monitor a temperature of the at least one pluggable device and the technology socket. The processor is configured to analyze the temperature sensor data and determine whether the at least one pluggable device and/or the technology socket is overheating if the temperature of the technology socket and/or the at least one pluggable device is over at least one threshold. Additionally, the processor is operable to send power consumption data and sensor data to at least one remote device and generate an alert based on the power consumption data and sensor data. The at least one remote device is operable to display the power consumption data.

In one embodiment, the technology socket includes at least one indicator. The at least one indicator includes an audio indicator, a visual indicator, and an audiovisual indicator 118. The technology socket is configured to generate an alert using the at least one indicator. For example, and not limitation, the at least one indicator is configured to provide an audio cue, a visual cue, and/or an audiovisual cue when at least one pluggable device is connected to the technology socket. In another embodiment, the at least one indicator is configured to generate an alert when the processor detects that a pluggable device is overheating, fully charged, or disconnect from the technology socket.

In one embodiment, the present invention includes a hot swappable pluggable device. The hot swappable pluggable device is usable for home, medical, school, industrial and other similar applications. In one embodiment, the pluggable device is configured for indoor quality particulate analysis, wireless networks, and sensors data and acquisition.

In yet another embodiment, the present invention includes a wireless communication module. The wireless communication module is configured to transmit power data from the technology socket to at least one remote device and a server. The server and the at least one remote device are operable to identify issues with the technology socket and generate an alert once a problem has been identified. Advantageously, the technology socket also includes a control module in network communication with the server and the at least one remote device. The control module is operable to receive a power control message from the server and the at least one remote device. The power control message includes power on, power off or change in current. In another embodiment, the present invention includes a detection module to monitor the electrical input and output of the technology socket. Alternatively, the technology socket includes an external power component (e.g. a power switch). The external power component is positioned on an exterior surface of the technology socket and is configured to deactivated power transfer when compressed. The power switch is further configured to reactive power transfer when decompressed.

Figures 7A, 7B, 7C:
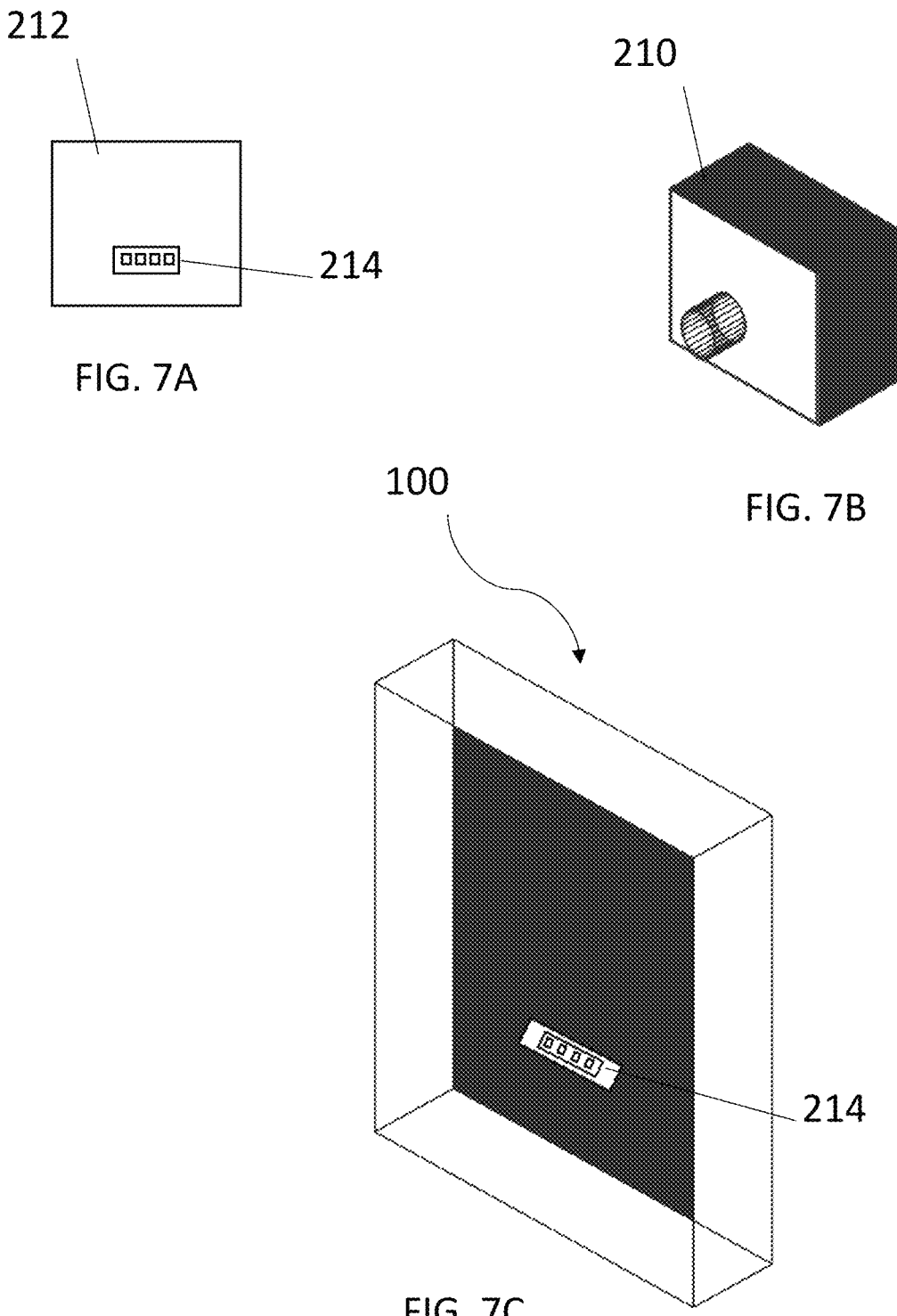
FIG. 7A illustrates a rear orthogonal view of a pluggable device according to one embodiment of the present invention.
FIG. 7B illustrates front perspective view of the pluggable device of FIG. 7A according to one embodiment of the present invention.
FIG. 7C illustrates a front perspective view of a technology socket operable to receive the pluggable device of FIG. 7B according to one embodiment of the present invention.

FIG. 7A illustrates a rear perspective of a pluggable device according to one embodiment of the present invention. The pluggable device 212 includes a connection port 214. In one embodiment, the connection port 214 includes a male connector that is operable to connect with a corresponding female connector. In another embodiment, the male connector includes a rectangular connector, a circular connector, a terminal block, a coaxial connector, a d-shaped connector, a pluggable connector, a universal serial bus (USB) connector, a micro USB connector, a lightning connector, a firewire connector, a USB-A connector, a USB-B connector, a USB-C connector, a digital video interface (DVI) connector, a HDMI connector, a video graphics array (VGA) connector, a router connector, a modem connector, a serial port connector, a Bayonet Neill-Concelman (BNC) connector, or other electrical connectors.

FIG. 7B illustrates a pluggable device according to one embodiment of the present invention. In one embodiment, the pluggable device is a camera 210. In one embodiment, the camera 210 includes a connection port as illustrated in FIG. 7A.

FIG. 7C illustrates a technology socket according to one embodiment of the present invention. In one embodiment, the technology socket 100 includes at least one connection port 214. The connection port 214 is operable for electrical contact between the technology socket 100 and at least one pluggable device. The electrical contact enables the technology socket 100 to provide power to the at least one pluggable device. In one embodiment, the connection port 214 includes a female connector. For example and not limitation, the female connector is operable to receive a rectangular connector, a circular connector, a terminal block, a coaxial connector, a d-shaped connector, a pluggable connector, a universal serial bus (USB) connector, micro USB connector, a lightning connector, a firewire connector, a USB-A connector, a USB-B connector, a USB-C connector a dvi connector, a HDMI connector, a Type A plug, a Type B plug, a Type C plug, a Type D plug, a Type E plug, a Type F plug, a Type G plug, a Type H plug, a Type I plug, a Type J plug, a Type K plug. a type L plug, a Type M plug, a Type N plug, a Type O Plug, and other electrical connectors/plugs.

Figure 7D:
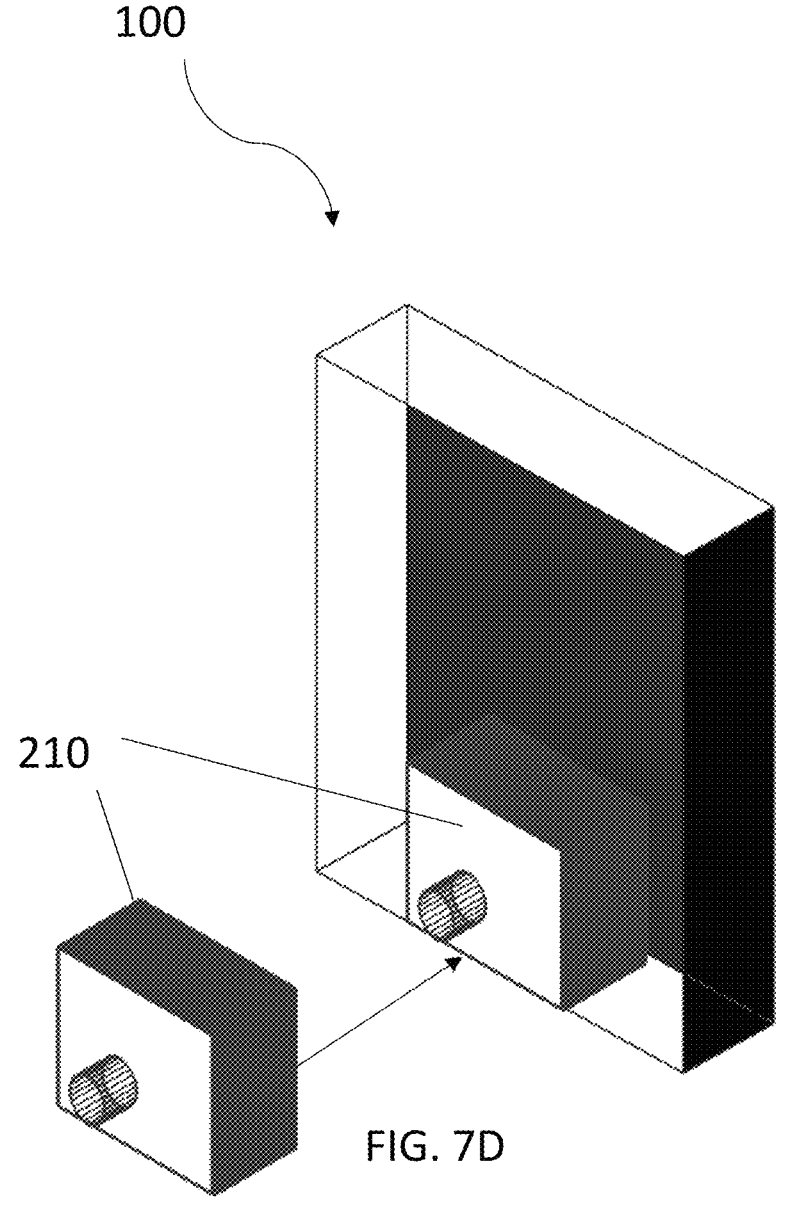
FIG. 7D illustrates the attachment mechanism of the pluggable device of FIG. 7B to the technology socket of FIG. 7C.

FIG. 7D shows a technology socket with an embedded pluggable device according to one embodiment of the present invention. In one embodiment, the pluggable device includes a camera 210. As shown in FIG. 7D, the camera 210 is easily inserted in the technology socket 100. In one embodiment, the camera 210 includes a connection port that is configured to mate with a connection port inside of the technology socket 100. In one embodiment, the camera 210 is mechanically held in place (ex. sliding lock or latch). In another embodiment, the camera 210 is magnetically held in position. The technology socket 100 is operable to receive data from the camera 210 and transmit it to the server and/or at least one remote device for data storage and visualization. Advantageously, the technology socket 100 is further operable to identify if the pluggable device is malfunctioning. The technology socket 100 is operable to continuously communicate with the server and/or at least one remote device to determine if the camera 210 has updated software. If the camera's 210 software is not updated, then the server is configured to send a software update to the technology socket 100, which is operable to update the camera 210.

In another embodiment, the present invention includes at least one adapter. For example and not limitation, the at least one adapter includes a Type A plug adapter, a Type B plug adapter, a Type C plug adapter, a Type D plug adapter, a Type E plug adapter, a Type F plug adapter, a Type G plug adapter, a Type H plug adapter, a Type I plug adapter, a Type J plug adapter, a Type K plug adapter, a Type L plug adapter, a Type M plug adapter, a Type N plug adapter, or other electrical adapters that enable the technology socket to receive and adapt to pluggable devices with different plugs and/or connectors. In another embodiment, the present invention includes a step-down converter. The step-down converter includes a surge protector to prevent the overpowering of the at least one pluggable device. In one embodiment, the step-down converter includes a buck converter. In another embodiment, the present invention includes a boost converter. In yet another embodiment, the present invention includes an AC to DC converter and/or an inverter. The present invention is operable to convert AC power to DC power or DC power to AC power. This enables the present invention to be used in homes, businesses, and other commercial applications and in conjunction with pluggable devices that use either AC or DC power. In one embodiment, the present invention includes a transformer. The transformer is operable to handle current from a power supply and transfer and/or covert the current to a port out connector. Advantageously, the step-down converter enables the technology to be used with any type of pluggable devices and power sources, thereby creating a universal socket. In one embodiment, the step-down converter is operable to receive an input voltage range from about 0 volts to about 240 volts. In another embodiment, the technology socket is configured to handle about between about 600 kWh to about 1000 kWH per month. In yet another embodiment, the technology socket is operable to determine the power requirements of at least one pluggable device and convert an input voltage from a power supply via the step-down converter. The universal socket is configured to be inserted into an electrical system and/or function on its own power supply and modify input voltages and output voltages based on design specifications and/or on requirements received from at least one remote device.

In yet another embodiment, the socket is configured to receive at least one plug. For example and not limitation, the at least one plug includes a Type A plug, a Type B plug, a Type C plug, a Type D plug, a Type E plug, a Type F plug, a Type G plug, a Type H plug, a Type I plug, a Type J plug, a Type K plug, a Type L plug, a Type M plug, a Type N plug, or other plugs use by pluggable devices that enable the technology socket to receive and adapt to pluggable devices. In other words, the socket of the present invention is a universal socket operable to receive a plurality of different plug types. In another embodiment, the socket is operable to receive a universal type plug.

In another embodiment, the technology socket is operable to support a mountable device. Preferably, the technology socket is operable for flush mounting. The flush mounting enables the present invention to remove the need for power cords and thereby remove the need to increase the power supply. The socket provides physical retention such that a surface of the socket is flush with a surface of a mounting location, such as a surface of a wall, ceiling, floor, fence, pole, post, abutment, roof, parapet or other location. In yet another embodiment, the technology socket includes an expandable (ex. telescopic) component that is operable to adapt to pluggable devices of different sizes. The expandable component allows for the technology socket to protect the pluggable devices. In one embodiment, the technology socket is expandable out of a wall. This prevents a pluggable device from hanging out of the technology socket without protection. The pluggable devices include, by way of example and not limitation, a speaker, a smoke detector, an outlet, at least one sensor, a wireless router, a network relay, a camera, a network device, a TV, a computer, a personal home device, and/or other similar electrical, wireless, or wired devices. In one embodiment, the at least one sensor includes an indoor air quality sensor.

Figure 8:
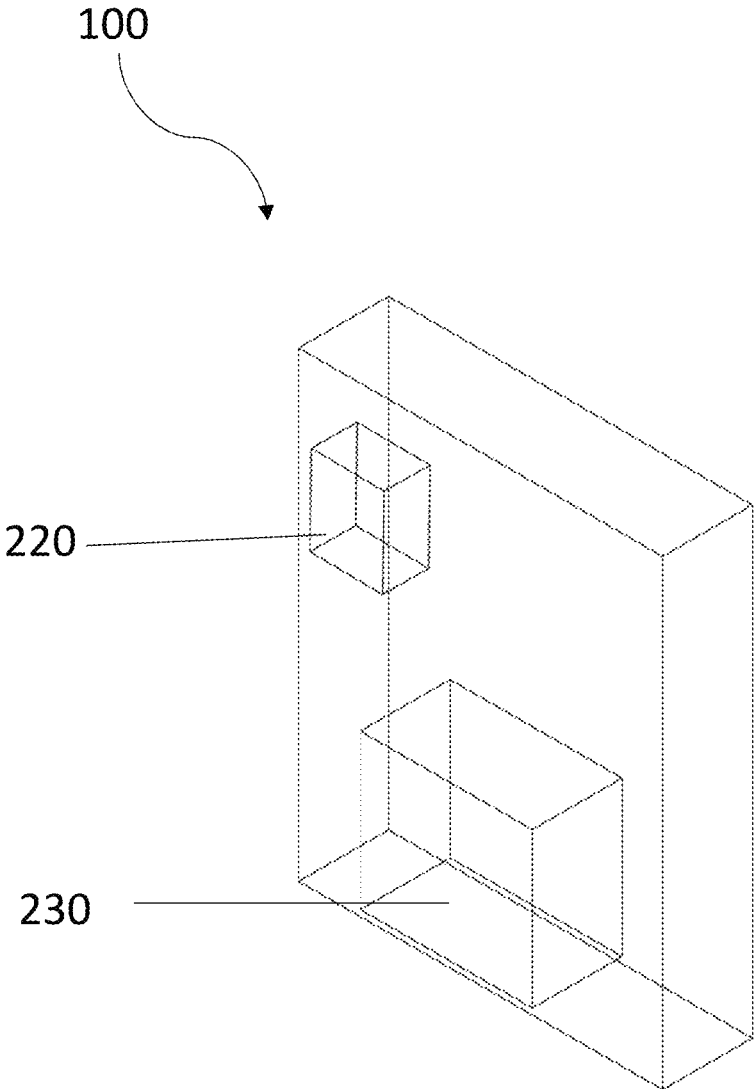
FIG. 8 illustrates a technology socket with a battery according to one embodiment of the present invention.

FIG. 8 illustrates a technology socket with at least one battery according to one embodiment of the present invention. In one embodiment, the at least one battery 220 is attached to the inside of the technology socket 100 and is operable to provide power to the technology socket 100 and/or the at least one pluggable device. The technology socket 100 includes at least one electrical device holder 230 and a controller. The controller inside the technology socket 100 is operable to control the power transmitted from the battery 220 and is operable to turn off the battery connection if it detects that the pluggable device is overheating and/or malfunctioning and if the battery is malfunctioning. The controller is further operable to determine whether power is needed and can prevent power transmission from the battery 220. Advantageously, the battery powered technology socket eliminates the need for the technology socket to be connected to a wire and allows the technology socket to provide power in remote locations.

Figure 9:
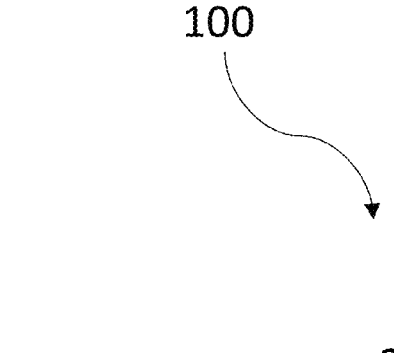
FIG. 9 illustrates a front orthogonal view of a technology socket according to one embodiment of the present invention.
Figure 9:
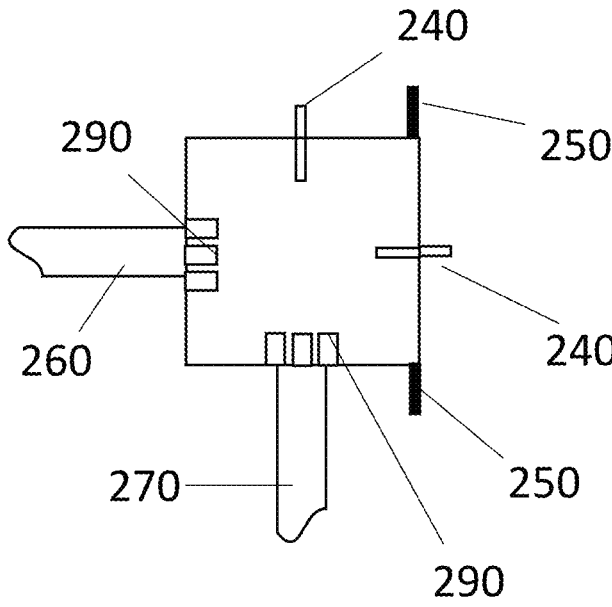
Figure 10:
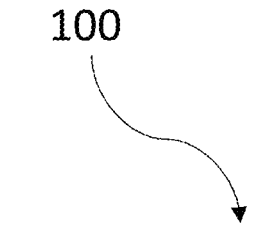
FIG. 10 illustrates a front perspective view of a technology socket according to one embodiment of the present invention.
Figure 10:
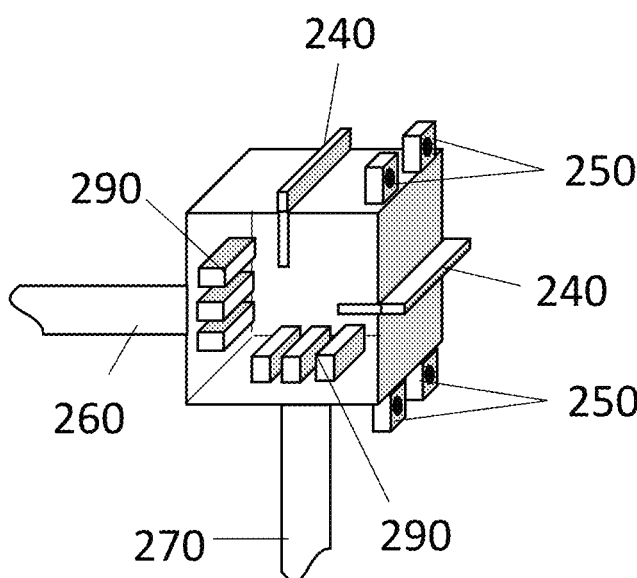

FIG. 9 illustrates a technology socket according to one embodiment of the present invention. The technology socket 100 includes an orientation portion 240, at least one mounting tab 250, a power in port 260, a power out port 270 and at least one power contact 290. The orientation portion 240 is operable for positioning the universal technology socket 100. Alternatively, the mounting tabs are not required. The at least one power contact 290 is operable to create electrical contract with at least one pluggable device and to provide power to the at least one pluggable device. FIG. 10 illustrates an isometric perspective of a technology socket according to one embodiment of the present invention.

In yet another embodiment, the technology socket includes at least one electrical storage device, at least one data and power connection device, and at least one sensor. The electric storage device includes at least one battery, wherein the at least one battery is an electrochemical cell. In one embodiment, the at least one battery is rechargeable. The electrochemical cells include alkaline, lithium ion, and/or alkaline. Advantageously, the electrical storage device allows for the technology socket to continue to provide power even when power goes out. Alternatively, the technology socket is operable to wirelessly provide power to a pluggable device.

In one embodiment, the technology socket includes fiber optics, a network connection, an internet cable, and/or a television cable. The technology socket is configured for data transmission and network communications with a pluggable device when the pluggable device is plugged into the technology socket. In one embodiment, the technology socket does not provide power to the pluggable device, but rather only provides data to the pluggable device via a hardwired connection, such as via a fiber optic cable, a cat5 cable, etc. In another embodiment, the socket is operable to provide power over ethernet (POE) to a pluggable device.

In yet another embodiment, the technology socket is configured for wireless power transfer. In one embodiment, the technology socket includes a wireless charging component. In another embodiment, the wireless charging component includes a coil. The wireless charging component is configured to create an electromagnetic field that is operable to transfer energy to the at least one pluggable device. For example, and not limitation, the wireless charging component includes a pad that is operable to receive the at least one pluggable device. The wireless charging component is configured to activate the electromagnetic field when the at least one pluggable device is positioned on the pad. In another embodiment, each compartment of the technology socket includes a wireless charging component. In yet another embodiment, the technology socket includes at least one battery and is configured to wirelessly transfer power from the at least one battery to the at least one pluggable device via the wireless charging component. Advantageously, this enables the technology socket to be used for mobile applications.

Figure 11:
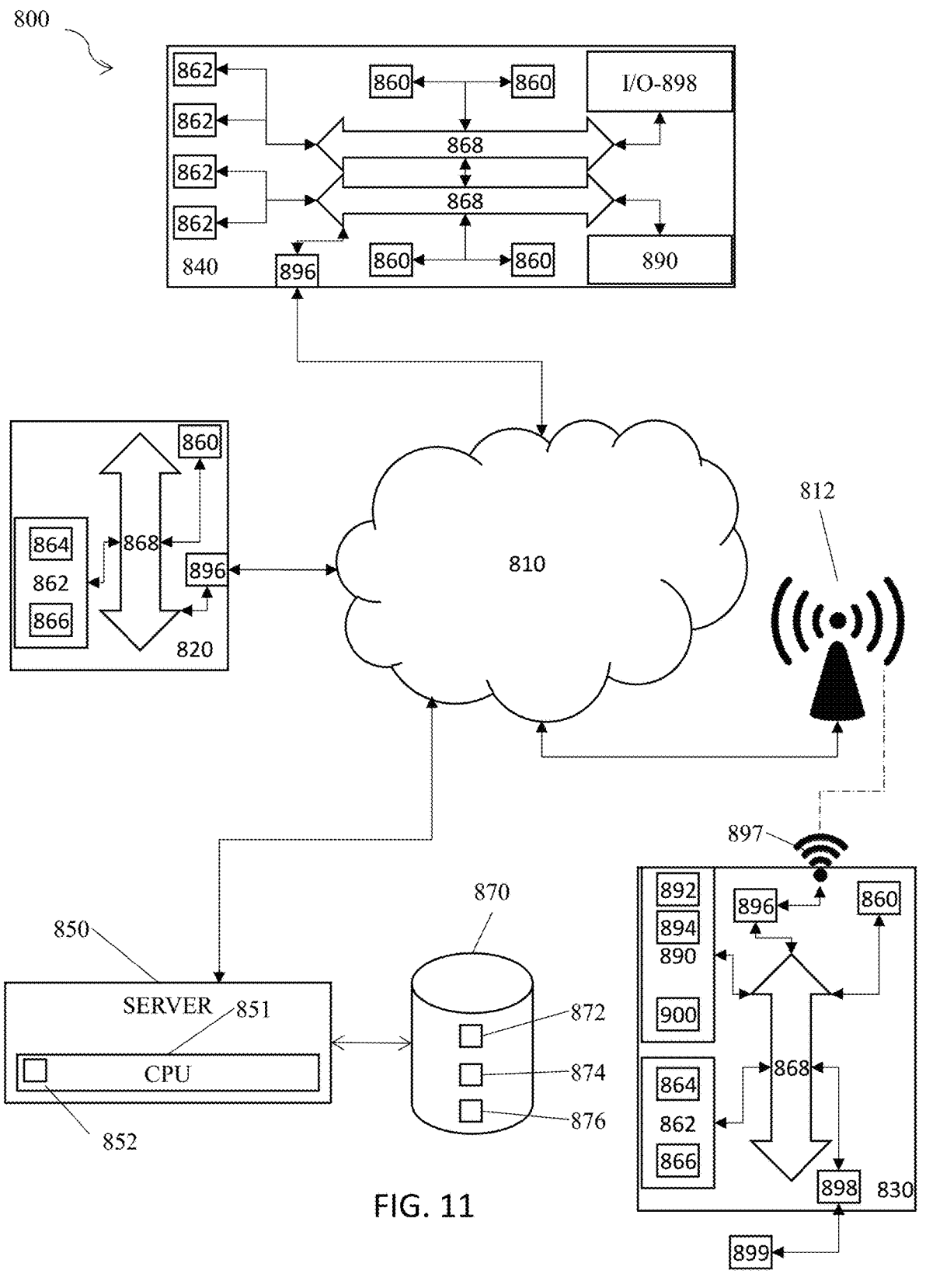
FIG. 11 is a schematic diagram of a system of the present invention.

FIG. 11 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICRO-WAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 11, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 11, is operable to include other components that are not explicitly shown in FIG. 11, or is operable to utilize an architecture completely different than that shown in FIG. 11. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:
1. A universal technology socket comprising:
a housing including a positioning component;
a processor;
at least one audiovisual indicator; and
at least one electrical pin;
wherein the housing includes at least one lever;

wherein the processor is operable to remotely activate movement of the at least one lever for the at least one lever to engage and disengage the housing;

wherein the engagement of the at least one lever with the housing locks the housing;

wherein the housing is configured to receive at least one pluggable device;

wherein the positioning component is configured to maintain a connection between the housing and the at least one pluggable device;

wherein the at least one electrical pin is operable to connect with the at least one pluggable device;

wherein the at least one audiovisual indicator is configured to generate a first alert when the at least one pluggable device is connected to the universal technology socket;

wherein the first alert comprises an audio cue and a visual cue;

wherein the processor is operable to be in active mode when the at least one electrical pin is connected to the at least one pluggable device and the processor is operable to be in sleep mode when the at least one electrical pin is not connected to the at least one pluggable device;

wherein the positioning component is configured to hold the at least one pluggable device in a position flush with the housing; and wherein the positioning component further includes an attachment component and an arm component operable to extend and retract, wherein the arm component is attached to the attachment component, wherein the attachment component is further configured to attach to the at least one pluggable device, wherein the arm component is configured to align the at least one pluggable device with the at least one electrical pin and move the at least one pluggable device towards the at least one electrical pin until a physical and/or an electrical connection is made.

2. The universal technology socket of claim 1, wherein the universal technology socket is further configured to connect to a power supply, wherein the universal technology socket is further configured to provide power to the at least one pluggable device through an electrical connection between the at least one electrical pin and the at least one pluggable device.

3. The universal technology socket of claim 2, wherein the processor is configured to determine at least one power requirement for the at least one pluggable device when the at least one pluggable device is connected to the at least one electrical pin.

4. The universal technology socket of claim 1, further including at least one battery, wherein the at least one battery is configured to power the universal technology socket and/or the at least one pluggable device, wherein the processor is configured to monitor a status of the at least one battery, wherein the processor is configured to stop the power transfer from the at least one battery to the universal technology socket and/or the at least one pluggable device when the battery status is below at least one threshold.

5. The universal technology socket of claim 4, further including at least one temperature sensor, wherein the at least one temperature sensor is in communication with the processor, wherein the processor is configured to turn off the at least one battery if a temperature of the universal technology socket and/or the at least one pluggable device is above at least one threshold.

6. The universal technology socket of claim 1, further including at least one sensor, wherein the at least one sensor includes an air quality sensor, wherein the universal technology socket is configured to send a second alert to at least one remote device based on air quality sensor data.

7. The universal technology socket of claim 1, wherein the universal technology socket is further configured to receive at least one connector, wherein the at least one connector includes at least one of a rectangular connector, a circular connector, a terminal block, a coaxial connector, a d-shaped connector, a pluggable connector, a universal serial bus (USB) connector, a micro USB connector, a lightning connector, a firewire connector, a USB-A connector, a USB-B connector, a USB-C connector, a digital video interface (DVI) connector, a High-Definition Multimedia Interface (HDMI) connector, a video graphics array (VGA) connector, a router connector, a modem connector, or a serial port connector.

8. The universal technology socket of claim 1, wherein the universal technology socket is operable to send a second alert to at least one remote device, wherein the second alert comprises an identified error for the universal technology socket.

* * * * *